(No Model.) 3 Sheets—Sheet 1.
H. MACKENZIE.
STEAM ENGINE.

No. 539,066. Patented May 14, 1895.

WITNESSES:
J. Littlejohn
Wm. A. Pollock

INVENTOR
Hugh Mackenzie
By Edwin H. Brown
HIS ATTORNEY (No Model.) 3 Sheets—Sheet 2.

H. MACKENZIE.
STEAM ENGINE.

No. 539,066. Patented May 14, 1895.

WITNESSES:
S. Littlejohn
Wm. A. Pollock

INVENTOR
Hugh Mackenzie
BY Edwin H. Brown
HIS ATTORNEY (No Model.)   3 Sheets—Sheet 3.
H. MACKENZIE.
STEAM ENGINE.
No. 539,066.   Patented May 14, 1895.
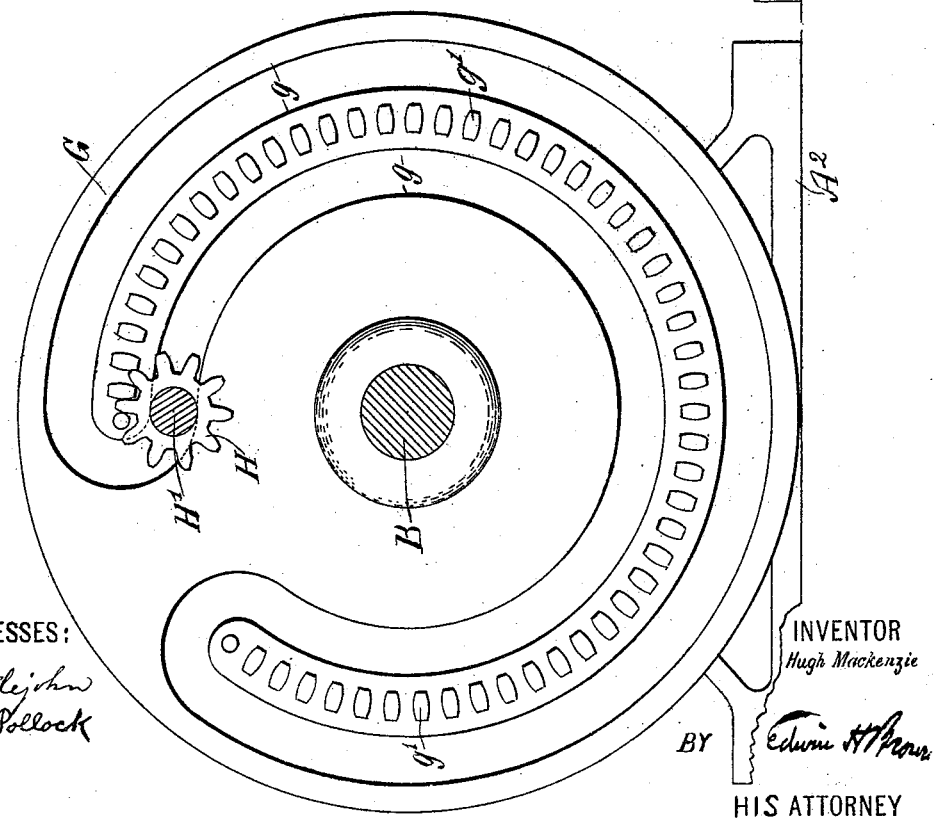
WITNESSES:
INVENTOR
Hugh Mackenzie
BY
HIS ATTORNEY

UNITED STATES PATENT OFFICE.

HUGH MACKENZIE, OF EDINBURGH, SCOTLAND.

STEAM-ENGINE.

SPECIFICATION forming part of Letters Patent No. 539,066, dated May 14, 1895.

Application filed March 30, 1894. Serial No. 505,663. (No model.)

*To all whom it may concern:*

Be it known that I, HUGH MACKENZIE, of Edinburgh, Scotland, have invented a new and useful Improvement in Steam-Engines, of which the following is a full, true, and exact description, reference being had to the accompanying drawings.

This improvement is especially intended for engines utilizing steam as a motive agent. I will describe an engine embodying my improvement, and then point out the novel features in the claims.

Figure 1:
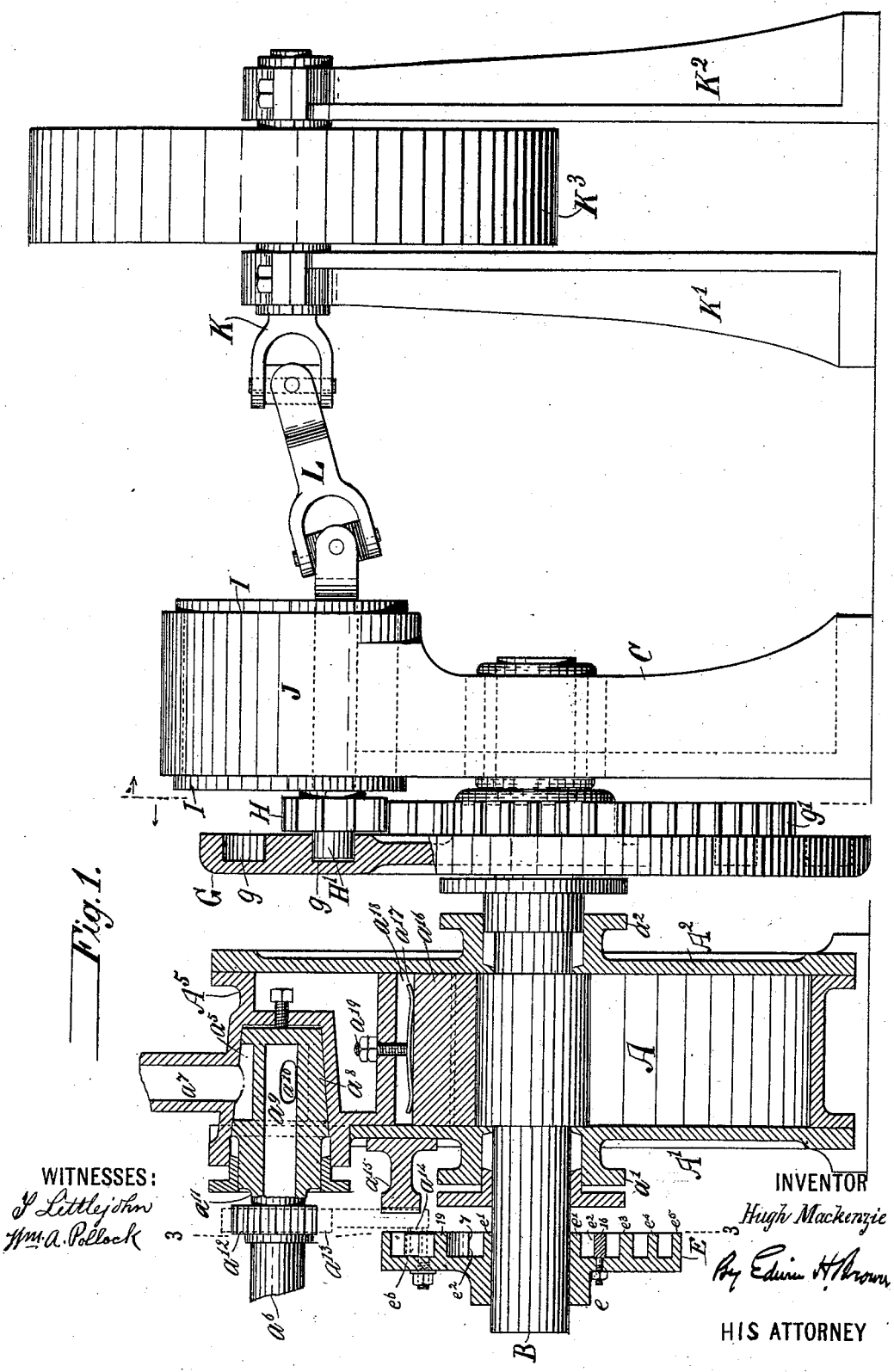
Figure 2:
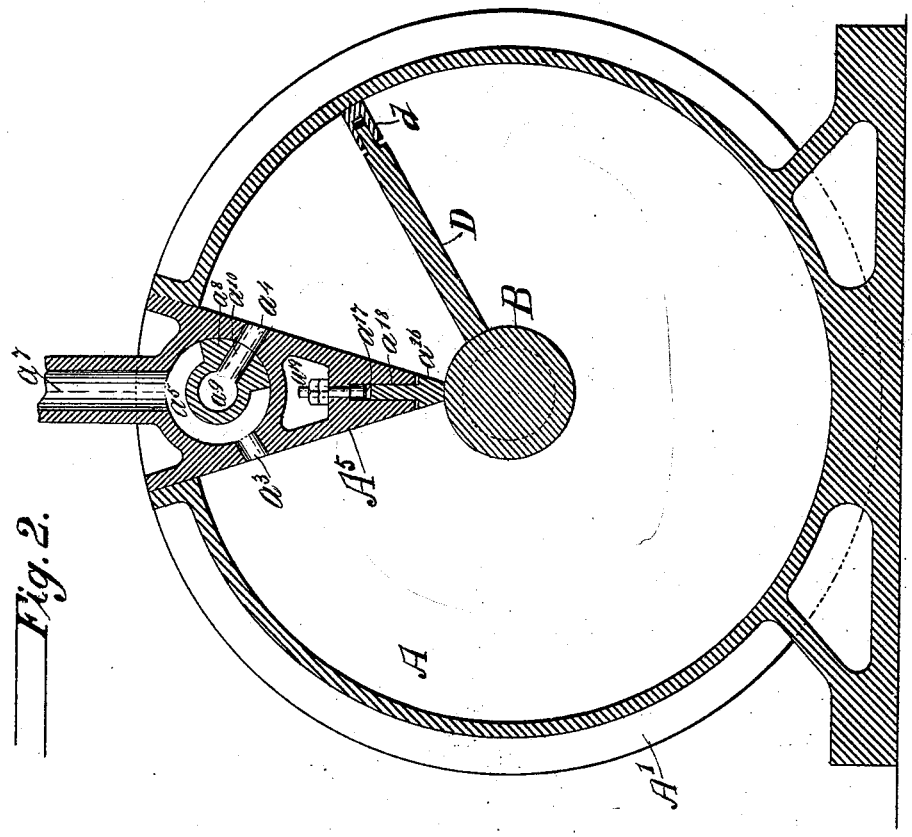
Figure 3:
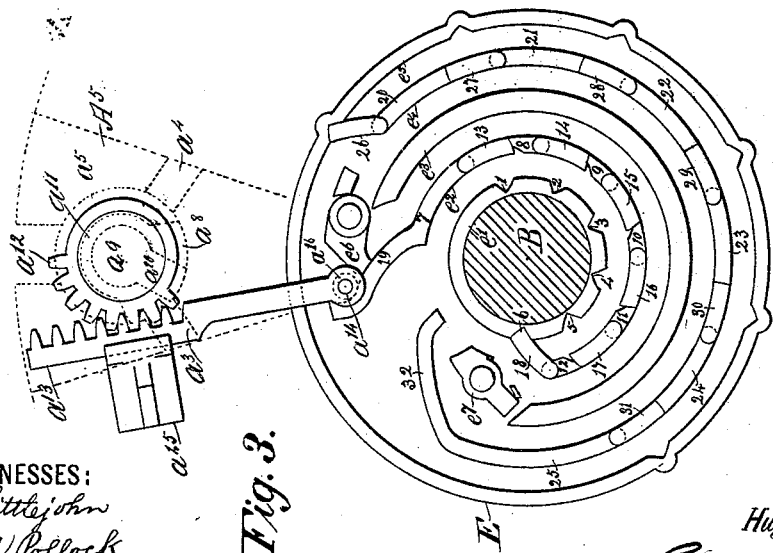

In the accompanying drawings, Figure 1 is a vertical section of an engine embodying my improvement, taken parallel with the main shaft. Fig. 2 is a vertical section taken transversely to said shaft. Fig. 3 is a sectional elevation taken at the plane of the dotted line 3 3, Fig. 1. Fig. 4 is a face view of a disk comprised in the said engine. Fig. 5 is a face view of an opposite part.

Similar letters and figures of reference designate corresponding parts in all the views.

A designates a chamber which may be made of any suitable material, as for instance, cast iron, and is constructed in the form of a hollow cylinder with removable end pieces or heads A', A² made in the form of disks.

B designates a main shaft which is passed through stuffing boxes $a'$, $a^2$ with which the end plates A', A² are provided. The ends of this shaft may be supported in bearings in any suitable manner. I have shown the shaft at one end having bearings in a pillow block C.

D designates a piston consisting of a plate or bucket extending radially from the shaft B. It is intended to reciprocate about the axis of the shaft B within the chamber A. It has an end piece $d$ which constitutes a packing and is adjustable radially, or in other words, toward the inner surface of the chamber A. A spring or springs may be employed to force and hold it outward. The ends of the piston may have similar pieces to prevent leakage between it and the end pieces or heads A', A².

A⁵ designates an abutment within the chamber A. It has flaring sides against which the sides of the piston may fit closely. At its outer extremity it has an adjustable bearing piece $a^{16}$ which is fitted to move radially, or in other words, relatively to the axis of the shaft B. This impinges against the shaft B or a hub formed therein and is maintained in contact therewith by means of a spring $a^{17}$ fitted into a recess $a^{18}$ formed radially in the abutment A⁵ for accommodating the shank of the bearing piece. This spring may be varied in force by means of a screw $a^{19}$.

In the abutment A⁵ are two ports $a^3$, $a^4$ which open at the sides of the abutment so as to direct steam or other motive agent against the piston. These ports communicate with a valve chest or chamber $a^5$ that is supplied with the motive agent through a pipe $a^6$ and relieved of the exhaust motive agent by a pipe $a^7$. Within the valve chest is an oscillating valve $a^8$. The live steam pipe communicates with a circular chamber $a^9$ formed in the body of the valve and escapes therefrom through a radial port $a^{10}$ which is of a size to communicate with either of the ports $a^3$, $a^4$.

The chamber A⁵ may well be made longitudinally tapering and the valve will then be provided with disks which taper in the same direction as the chamber; the advantages of this construction being to produce a tight fit between the valve and the chamber.

The valve $a^8$ has a stem $a^{11}$ which extends to the live steam pipe, a stuffing box being employed to prevent leakage while allowing the working of the valve relatively to the said pipe. On this valve stem $a^{11}$ is affixed a toothed sector or gear wheel $a^{12}$ with which engages a rack $a^{13}$, the latter being pivoted to a pin $a^{14}$ and guided by a bearing $a^{15}$ so as to maintain engagement with the sector or gear wheel $a^{12}$.

It is obvious that when the valve is oscillated in one of its extreme positions, live steam will be admitted to one of the ports $a^3$, $a^4$ and the other of these ports will be then in communication with the exhaust pipe. Live steam will thus be admitted at one side of the piston and expended steam will be allowed to escape or exhaust through the valve adjacent to the exhaust pipe. The piston will travel until it reaches the abutment. A reversal of the valve will reverse the action of the piston and cause it to move to the other side of the abutment.

I will now describe the manner whereby the rack $a^{13}$ is reciprocated.

E designates a disk having a hub $e$ which is fast to the main shaft B and oscillated with such shaft and hence with the piston D. It is provided with a number of ribs $e'$, $e^2$, $e^3$, $e^4$, $e^5$ which project from that face of the disk which is toward the chamber A. These ribs are made in circles or segments of circles which are concentric to each other and to the main shaft B. The inner rib $e'$ is a plain circular rib and it has notches 1, 2, 3, 4, 5, 6 in its periphery. The rib $e^2$ is mainly circular and it comprises a portion 7, which is formed integral with or rigidly connected to the disk and a number of portions 8, 9, 10, 11, 12, which are made in the form of short segments and are rigidly connected with the disk. At the ends of these segments 7, 8, 9, 10, 11, 12, a number of pawls 13, 14, 15, 16, 17, 18, are pivoted, which are so positioned with reference to the notches 1, 2, 3, 4, 5, 6, of the inner rib $e'$, that their free ends are capable of engaging with said notches. From one extremity of the segment 7, the rib $e^2$ has a portion which extends outward at an incline to a radius of the main shaft B. The rib $e^3$ is a plain segment of a circle which at one end stops at a short distance from the portion 19 of the rib $e^2$. The rib $e^4$ comprises a number of segments 20, 21, 22, 23, 24, 25, at corresponding ends of which are pivoted pawls 26, 27, 28, 29, 30, 31. From the end of the segment 25 an inwardly extending portion 32 extends across from one end of the ribs $e^3$, $e^2$ and toward the rib $e'$. The rib $e^5$ is made in the form of a circle with notches, but so positioned that the pawls 26, 27, 28, 29, 30, 31 may engage with them. Opposite the portion 19 of the rib $e^2$ and the adjacent end of the rib $e^3$ is a pivoted latch $e^6$ and opposite the reverse end of the rib $e^3$ is a pivoted latch $e^7$.

The pawls 13, 14, 15, 16, 17, 18 and their pivots extend through the disk E and are provided with screw-threads to which clamping nuts are applied outside of the disk. Thus it is possible to adjust these pawls into line with the segments 7, 8, 9, 10, 11, 12, so as to form therewith a continuous segment, the pawls being curved correspondingly to the segments 7, 8, 9, 10, 11, 12; and it is also possible to turn any one of these pawls inward into the opposite notch of the rib $e'$. The pawls when adjusted may be clamped in position.

The pawls 26, 27, 28, 29, 30, 31 are constructed in the same manner as the other set of pawls and therefore may be clamped in different positions, so that all but one may be made to form continuations of the same circle as the segments 20, 21, 22, 23, 24, 25, and so that any one may be deflected into the corresponding notch of the rib $e^5$.

The rack $a^{13}$ extends between the plane of the ribs $e'$, $e^2$, $e^3$, $e^4$, $e^5$ and the opposite wall of the chamber A. It has an anti-friction roller $a^{16}$ and when the disk E and its ribs $e'$, $e^2$, $e^3$, $e^4$, $e^5$ are oscillated in one direction, this anti-friction roller is acted upon by the pivoted latch $e^6$, and this being then incapable of turning to one side, the roller is deflected up against the rib $e^5$. Thus the rack is reciprocated and the valve oscillated. The valve then remains in position until the first pawl 25, 27, 28, 29, 30, or 31 of the rib $e^4$, which is deflected inward into the corresponding notch of the rib $e^5$ acts upon said roller $a^{16}$. When this happens the roller $a^{16}$ is caused to move down between the ribs $e^3$ and $e^4$. Thus the rack is reciprocated inwardly and the valve correspondingly oscillated. As the ribs $e^3$ and $e^4$ are concentric for the greater portion of their extent, the roller $a^{16}$ will not be affected and consequently the valve will remain stationary until the roller $a^{16}$ reaches the inwardly extending portion 32 of the rib $e^4$. When this happens, the roller $a^{16}$ will be moved inward past the latch $e^7$ until it reaches the opening between this latch and the extremity of the portion 32 of the rib $e^4$. Now the disk reverses and the roller $a^{16}$ is moved inward until it reaches the first pawls 13, 14, 15, 16, 17 or 18 of the rib $e^2$ which is turned inward into the corresponding notch of the rib $e'$, whereupon the roller $a^{16}$ will be moved outward to the space between the ribs $e^2$ and $e^3$. The valve will be oscillated by the outward movement of the roller $a^{16}$ to the space between the ribs $e^2$, $e^3$. As the ribs $e^2$ $e^3$ are mainly concentric, the valve will have no further motion until the roller $a^{16}$ will by the reverse movement of the disk E come in contact with the latch $e^6$ which it turns aside so as to be able to pass to the starting position.

By adjusting any one of each of the two sets of pawls, into its corresponding notch in the opposite rib, it will be possible to secure a different operation of the valve to effect the cutting off and exhausting of the motive agent in the chamber A at different points.

Although I have only thus far described this as an engine, it is obvious, that by applying power to the main shaft it may be used as a pump.

G designates a disk, having a groove $g$ in one face and a toothed gear $g'$ corresponding in outline to the outline of the groove. With this gear engages a pinion H, which is mounted upon a shaft H' that at one end engages with the groove $g$ of the disk G. The shaft H' is supported in a bearing in a rotary head I, and the latter is supported in a bearing J, forming part of the pillow-block C. As the main shaft B oscillates, the disk G with its groove $g$ and gear $g'$, acting upon the pinion H and the shaft H', which is supported in the rotating bearing J, will impart continuous rotary motion to said shaft H'. As the shaft H' revolves as well as rotates, I combine with it a shaft K, the two shafts being connected by a universal coupling L. The shaft K is supported in ordinary fixed bearings, formed in standards K', K², and this shaft is provided with a belt pulley K³, over which power may be transmitted to any suitable place.

What I claim as my invention, and desire to secure by Letters Patent, is—

1. The combination with a chamber of circular form, a piston oscillating therein, a valve chamber, ports communicating between the valve chamber and the piston chamber, a valve and means actuating said valve and comprising a number of circular ribs having transversely extending portions, substantially as specified.

2. The combination with a chamber of circular form, a piston oscillating therein, a valve chamber, ports communicating between the valve chamber and the piston chamber, a valve and means actuating said valve and comprising a number of circular ribs having transversely extending portions, the transversely extending portions of some of the ribs being made as pawls so as to be adjustable, substantially as specified.

In testimony whereof I have signed my name to this specification in the presence of two subscribing witnesses.

HUGH MACKENZIE.

Witnesses:
WILLIAM SMITH,
JOHN MCWILLIAM.